United States Patent [19]
de Barbuat

[11] Patent Number: 5,937,994
[45] Date of Patent: Aug. 17, 1999

[54] CONTAINER CONVEYING INSTALLATION FOR PREPARING SETS OF OBJECTS

[75] Inventor: Charles Antoine de Barbuat, Nuits-Saint-Georges, France

[73] Assignee: Savoye Nouvelle Societe Anonyme, France

[21] Appl. No.: 08/958,092

[22] Filed: Oct. 27, 1997

[30] Foreign Application Priority Data

Nov. 8, 1996 [FR] France .................................. 96 13785

[51] Int. Cl.$^6$ ................................................. B65G 37/00
[52] U.S. Cl. .................................... 198/346.2; 198/346.1; 198/465.2
[58] Field of Search ............................ 198/346.1, 346.2, 198/465.2

[56] References Cited

U.S. PATENT DOCUMENTS

| | | | |
|---|---|---|---|
| 4,568,947 | 2/1986 | Welder | 198/346.2 |
| 5,145,052 | 9/1992 | Santandrea et al. | 198/346.2 |
| 5,653,014 | 8/1997 | Faraoni et al. | 198/346.1 |

*Primary Examiner*—William E. Terrell
*Assistant Examiner*—Mark Deuble
*Attorney, Agent, or Firm*—Laubscher & Laubscher

[57] ABSTRACT

A container conveying installation comprises a forward conveyor and a backward conveyor the downstream and upstream ends of which are connected by a container transfer device for conveying containers is opposite directions. Plural loading conveyors on which containers receive predetermined objects extend along one of the forward and backward conveyors. To shorten the route of the containers and to prevent obstructions on the forward and backward conveyors upstream of saturated loading conveyors, plural devices located between the loading conveyors can transfer containers from the forward conveyor to the backward conveyor. Similarly, plural devices located between the ends of the loading conveyors can transfer containers from the backward conveyor to the forward conveyor.

17 Claims, 6 Drawing Sheets

CONTAINER CONVEYING INSTALLATION FOR PREPARING SETS OF OBJECTS

BACKGROUND OF THE INVENTION

1. Field of the Invention

The present invention relates to a container conveying installation comprising a forward conveyor and a backward conveyor for conveying containers in opposite conveying directions, plural loading conveyors arranged along one of the forward and backward conveyors, and plural first means for transferring containers from the one of the forward and backward conveyors to upstream ends of respective loading conveyors.

A conveyor arrangement of this kind constitutes a station in a warehouse where orders for objects are prepared automatically. A main conveyor distributes containers to a plurality of stations in accordance with ordered objects that are to be placed in the containers on the loading conveyors.

2. Description of the Prior Art

In each station, a container necessarily passes through means for transferring containers situated between the downstream end of the forward conveyor and the upstream end of the backward conveyor, even if the sole loading conveyor on which the container must stop temporarily is situated at the opposite end, i.e. at the downstream end of the backward conveyor.

Furthermore, if a plurality of successive containers must be directed to the same loading conveyor, the latter may become saturated, causing congestion on said one of the forward and backward conveyors and preventing subsequent containers from being conveyed to other loading conveyors that are available.

OBJECTS OF THE INVENTION

The main object of the present invention is to remedy the aforementioned drawbacks.

Another object of this invention is to shorten the route of containers to a given loading conveyor and to route containers regardless of the state of saturation of loading conveyors upstream of the given loading conveyor.

SUMMARY OF THE INVENTION

Accordingly, a container conveying arrangement comprises a forward conveyor and a backward conveyor for conveying containers in opposite conveying directions, a plurality of loading conveyors arranged along one of said forward and backward conveyors, a plurality of first means for transferring containers from said one of said forward and backward conveyors to upstream ends of respective loading conveyors, and a plurality of second means for transferring containers from said forward conveyor to said backward conveyor.

Preferably, at least one of the second transferring means is located between a downstream end and an upstream end respectively of two consecutive loading conveyors along the one of the forward and backward conveyors or is transversely aligned with one of the first transferring means.

The second transferring means can also shorten the route of the containers on the forward and backward conveyors so that they rapidly reach the loading conveyors where they are to receive objects. This shortening avoids congestion of the forward and backward conveyors by containers that do not need to pass in front of all of the loading conveyors.

To increase further the mobility of the containers on the forward and backward conveyors, the arrangement according to the invention can include a plurality of third means each located between ends of one respective loading conveyor for transferring containers from the backward conveyor to the forward conveyor. Preferably, the third transferring means are located near downstream ends of respective loading conveyors. The arrangement of the invention can include a plurality of third transferring means located between the ends of said one respective loading conveyor.

The third transferring means re-inject containers onto the forward conveyor without moving away from the loading conveyor where the containers are to be loaded so that they route in the station until the loading conveyor on which they are to be loaded becomes free. This "forced" loop route in the station keeps the containers near their loading conveyor while simultaneously allowing other containers addressed to other loading conveyors to pass by.

In order to reduce the arrangement cost, the second transferring means are respectively located periodically between groups of consecutive loading conveyors, and third means respectively located near the second transferring means are provided for transferring containers from the backward conveyor to the forward conveyor. Preferably, each second transferring means is located upstream of the third transferring means located near it, in the conveying direction of the forward conveyor.

The arrangement can further comprise fourth means for transferring containers from the loading conveyors to said one of the forward and backward conveyors, respectively. The fourth transferring means are preferably located at upstream end s of the loading conveyors respectively. It can be also provided at least one fifth transferring means located between the ends of one of the loading conveyors for transferring containers from said one loading conveyor to said one of the forward and backward conveyors.

As a variant, to reduce the cost of the arrangement, in place of a pair of fourth and first transferring means substantially back-to-back there are provided means located at a downstream end of one of two consecutive loading conveyors and an upstream end of the other of the two consecutive loading conveyors partly for transferring containers from said one of the forward and backward conveyors to the upstream end of the other of the two consecutive loading conveyors and partly for transferring containers from the downstream end of said one of the two consecutive loading conveyors to said one of the forward and backward conveyors.

The arrangement according to the invention can be completed by a plurality of loading conveyors extending along the other of the forward and backward conveyors and associated with other transferring means.

To free up the space in front of the loading positions whilst retaining facilities for monitoring objects taken up at the loading positions, the conveyors are lowered and rest on the floor. Each loading conveyor is then associated with a table raised relative to the loading conveyor, means arranged upstream of the table for lifting a container from the loading conveyor onto the table and means arranged downstream of the table for lowering a container from the table onto the loading conveyor. The lifting means, the table and the lowering means can be located in the vicinity of the upstream end of the associated loading conveyor.

Objects to be placed in a container disposed on the table can be monitored by reading bar codes on each object to be placed in the container, for example. In another variant, the monitoring of objects to be placed in each container is complemented by a weight check using means such as a weighing device associated with the table, for example, monitoring the load of the container each time an object or a batch of objects is placed in the container.

According to another embodiment of the arrangement according to the invention, the loading conveyors are each replaced by or each include a forward loading conveyor and a backward loading conveyor arranged substantially perpendicular to said one of the forward and backward conveyors and means for transferring containers from a downstream end of the forward loading conveyor to an upstream end of the backward loading conveyor.

In this embodiment, the forward loading conveyor and the backward loading conveyor can also be associated with a table raised relative to the forward and backward loading conveyors, means arranged upstream of the table for lifting a container from the downstream end of the forward loading conveyor onto the table and means arranged downstream of the table for lowering a container from the table onto the upstream end of the backward loading conveyor. In this embodiment the table can also be associated with means for checking objects to be placed in a container on the table.

In a prefered embodiment, each conveyor has a plurality of narrow parallel bands. Each means for transferring containers between two respective conveyors comprises respective rolls extending between the bands of the two conveyors, means for rotating the rolls in the direction to transfer a container from one of the two respective conveyors towards the other and means for raising the rolls above the bands of the two respective conveyors and for lowering the rolls below the bands of the two respective conveyors.

BRIEF DESCRIPTION OF THE DRAWINGS

Further features and advantages of the invention will be apparent more clearly from the following description of several preferred embodiments of the invention as illustrated in the corresponding accompanying drawings in which.

DETAILED DESCRIPTION OF THE PREFERRED EMBODIMENTS

Figure 1:
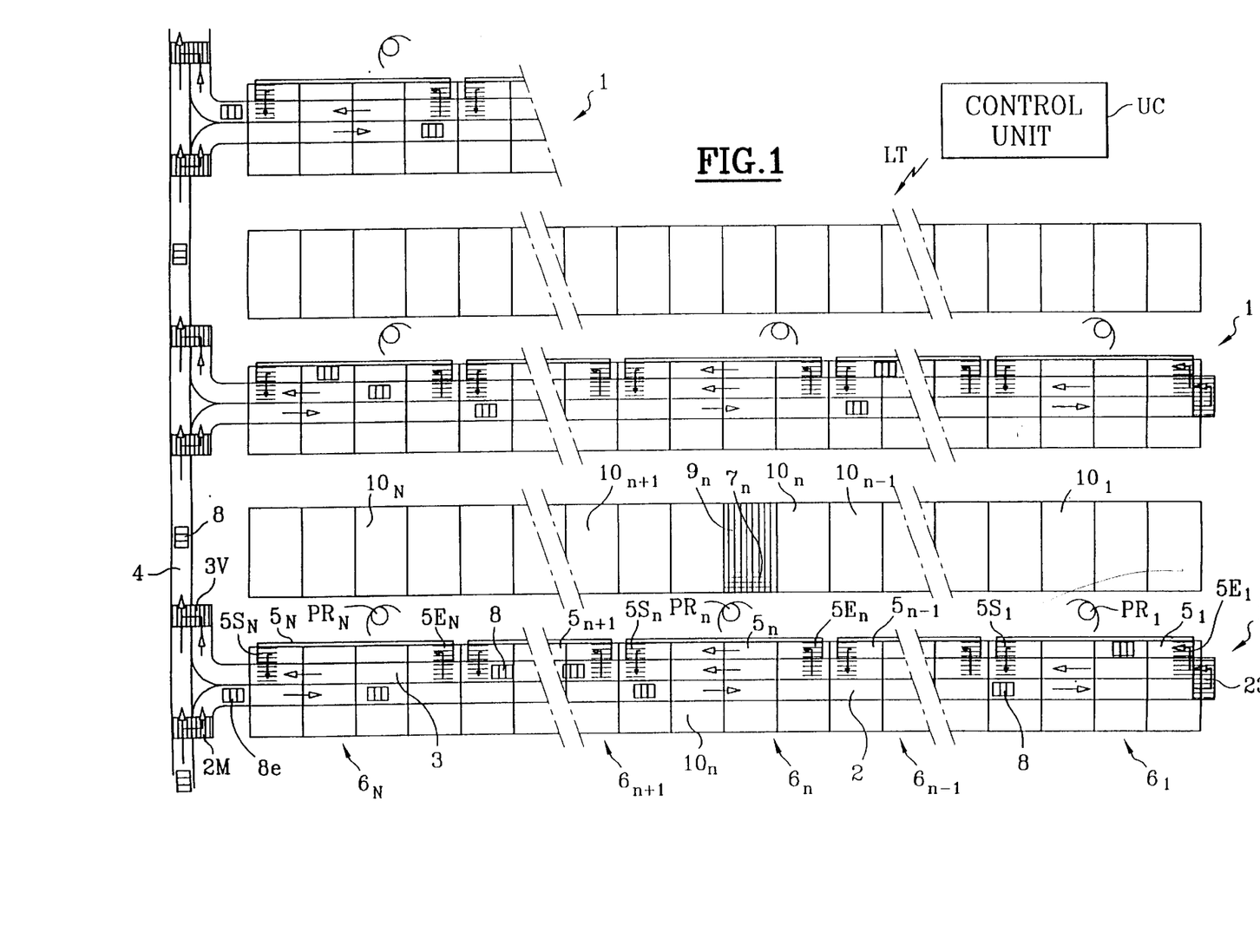
FIG. 1 is a schematic plan view of a conveyor installation according to the invention with a plurality of stations.

Referring to FIG. 1, a conveyor installation for preparing sets of objects comprises a plurality of stations 1 each of which includes a forward conveyor 2 and a backward conveyor 3. The conveyors 2 and 3 extend one alongside the other perpendicularly to a main conveyor 4 and run in opposite directions. In a station 1 a plurality of loading conveyors $5_1$ through $5_N$, where N is an integer between 2 and 10, for example, extend successively along the longitudinal side of one of the forward and backward conveyors, the backward conveyor 3 in the embodiment shown in FIG. 1, from its upstream end to its downstream end. A loading conveyor $5_n$, where n is an integer between 1 and N, delimits a loading position $6_n$ where particular objects $7_n$ are selected and loaded into containers 8, such as cardboard boxes.

Empty containers are initially stored in a launch position situated at the upstream end of the main conveyor 4. An association is established at the launch position between a container and filling instructions which are, for example, detected by reading bar codes identifying each container and the loading positions to which it must be directed. These instructions imply stopping the container in a predetermined number of loading positions. In a preferred embodiment that will be referred to hereinafter, the containers are launched stepwise onto the main conveyor 4 one after the other, which avoids any accumulation of containers. All the conveyors run at a constant conveying speed, so that the position of each container in the installation is known at all times by means of container-detecting photo-electric cells which are situated along the conveyors and in particular at the devices for transferring the containers from one conveyor to another conveyor.

When a container 8e must be loaded in at least one of the loading positions of a particular station 1, it enters at the upstream end the forward conveyor 2 of the particular station via a transfer device 2M which automatically transfers the container 8e from the main conveyor 4 to the forward conveyor 2. The container 8e is empty if the predetermined station 1 is the first most upstream station on the main conveyor 4 or if the container 8e has not yet passed through at least one station preceding the particular station; or the container 8e is partly filled with objects that were put in it when the container 8e was in one or more stations preceding the particular station. Each container 8 at the upstream end of the forward conveyor 2 can reach the downstream end of the forward conveyor, although passing via this downstream end is not obligatory, as will be explained below. The downstream end of the forward conveyor 2 and the upstream end of the backward conveyor 3 in the station 1 are connected by a transfer device 23 for transferring containers from the forward conveyor to the backward conveyor. In an alternative embodiment the transfer device 23 can be replaced by means for turning the containers 180° between the downstream end of the forward conveyor 2 and the upstream end of the backward conveyor 3.

Depending on the objects to be loaded into the container 8 on the backward conveyor 3, the container 8 can be diverted from the backward conveyor 3 to stop temporarily in one or more loading positions $6_1$ through $6_N$. A container 8 enters a particular position $6_n$ via an entry transfer device $5E_n$ to transfer the container 8 from the backward conveyor 3 to the upstream end of the loading conveyor $5_n$. Means $PR_n$ for picking objects, such as a picker, pick objects $7_n$ from compartments $9_n$ of a rack $10_n$ associated with the position $6_n$. In the embodiment shown in FIG. 1, each rack $10_n$ comprises two sets of facing compartments. One set is disposed above the conveyors 2 and 3 and the other set is disposed on the floor and separated from the backward conveyor 3 by a station corridor along which the pickers $PR_1$ through $PR_N$ travel in the positions $6_1$ through $6_N$. The sets of compartments can be "transrack" devices in which the compartments are inclined towards the corridor to supply objects dynamically. After the objects are picked from the compartment $7_n$ by the picker $PR_n$ and the container 8 has been loaded with the picked objects, the picker $PR_n$ pushes the loaded container towards the backward conveyor 3. However, as shown in FIG. 1, it is preferable for an output transfer device $5S_n$ located at the downstream end of the loading conveyor $5_n$ to transfer the loaded container 8 from the loading conveyor $5_n$ to the backward conveyor 3. About ten containers can remain in the position $6_n$ on the loading conveyor $5_n$ between the transfer devices $5E_n$ and $5S_n$.

After passing through and/or being loaded in one or more positions $6_{n+1}$ through $6_N$, the container 8 leaves the station 1 through a transfer device 3V situated at the downstream end of the backward conveyor 3 for transfer from the backward conveyor 3 to the main conveyor 4. The partly or totally filled container 8 then passes if necessary through one or more subsequent stations, if further objects are to be loaded into it, and is finally routed to a container closing position situated at the downstream end of the main conveyor 4 and then through a container shipping position.

A set of objects can constitute an order for objects filled in a storage and dispatch warehouse. The objects are, for example, books, cans, bottles, sachets or other forms of packaging, for example, for foodstuffs, pharmaceutical products or cosmetics. In a different application a set of objects may be intended to be fed to a treatment or assembly workshop, for example tools, mechanical parts and electronic apparatus components.

An object $7_n$ is defined by three main parameters, for example: the location ($9_n$, $10_n$) at which the object is stored in the station, the weight of the object, and an identifier identifying the object, to which the designation of the objects may be attached. Heavy objects are preferably introduced into the stations at the upstream end of the main conveyor 4 so that they are placed in the bottom of the containers first.

The object parameters are prerecorded and managed in a central control unit UC included in a supervisory data processing system and connected bidirectionally to the loading positions $6_1$ through $6_N$ in all the stations. Communications are set-up and cleared down between the positions and the control unit in accordance with a message transmission protocol that is known in itself. The link for transmitting messages and data between the unit and the positions is adapted to suit the constraints of installation of the positions in the stations. For example, the transmission link is an infra-red wireless link or a radio link, where necessary using appropriately located beacons, for example at the ends of the station corridors in front of the main conveyor 4.

Codes of an object are written on the object or on a label attached to it. The object codes are bar codes, for example. Code readers in the loading positions are adapted to suit the codes.

For example, a first object code designates the object in encoded form and is read when it must be picked in a loading position. A second object code translates into coded form a serial number and/or a batch number and/or a class of object to which the object belongs and is to be transmitted from the loading position at which the object is picked to the central control unit UC for subsequent management of the objects.

Some objects do not have codes that can be read by an electronic reader and can only be monitored, if required, with reference to their weight.

A container 8 can be a bin, a cardboard case or tray, or any other open receptacle. The containers 8 can have different dimensions. If the containers are to be shipped, they can be provided with heat-shrink film applied in a container forming position upstream or downstream of the main conveyor 4 and heat-shrunk onto the objects in a position for heat-shrinking the film and closing the containers situated downstream of the main conveyor 4. The heat-shrink films hold the objects onto the bottom of the containers in a compact shape. In the closing position downstream of the main conveyor 4 each container is closed, for example by fitting a lid, possibly after reducing its height according to the height of the load in the container.

Figure 2:
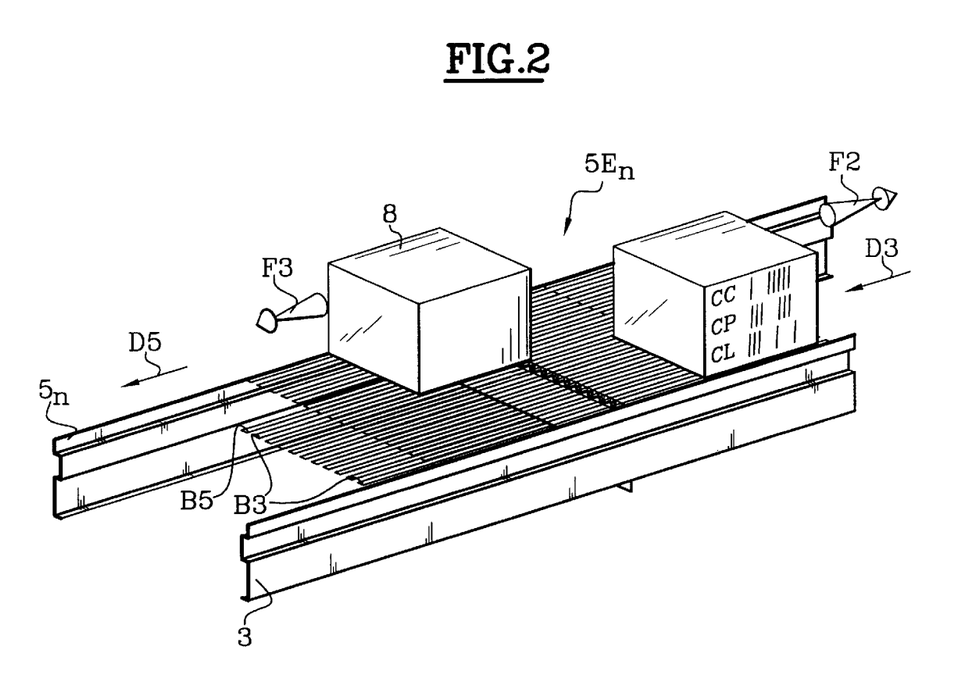
FIG. 2 is a perspective view of a transfer device for transferring containers between two conveyors disposed one alongside the other in the installation according to the invention.

At least one container code CC, one position code CP and one picking list code CL are applied directly to one of the vertical walls of the container 8 or to a label, as shown in FIG. 2. These three codes are of the same type as that carried by an object, for example, i.e. bar codes in this instance. The code CC identifies the container, i.e. it constitutes a container address enabling the control unit UC to monitor and modify the routing of the container by deducing the position of the container on the conveyors, in particular from the time of launching the container, the speeds of the conveyors and data supplied by the detector cells, if necessary in combination with bar code readers disposed at the entry of the loading conveyors $5_n$, upstream of the entry transfer devices $5E_n$ in such manner as to secure the switching of containers along the backward conveyor 3. The code CC also indicates the dimensions, i.e. the capacity, of the container in order to select containers according to the batches of objects to be loaded therein. The code CP identifies the destination loading position or positions at which objects are to be picked to load the container 8. The code CL identifies the list of the objects to be loaded into the container, the details of this list being transmitted in part or in full by the control unit UC to a destination loading position, according to whether the whole or a part of the list of objects is to be loaded into the container at the position in question.

The conveyors 2, 3, 4 and $5_1$ through $5_N$ are multiband conveyors, for example, although they can be of the roll, roller, pallet or plate type. All the transfer devices included in the embodiments of the preparation installation in accordance with the invention for transferring containers from one conveyor to another conveyor are adapted to suit the type of conveyor: for example, the transfer devices associated with multiband conveyors are transfer devices with driven rolls that rise and descend, similar to that described in detail hereinafter.

Figure 3:
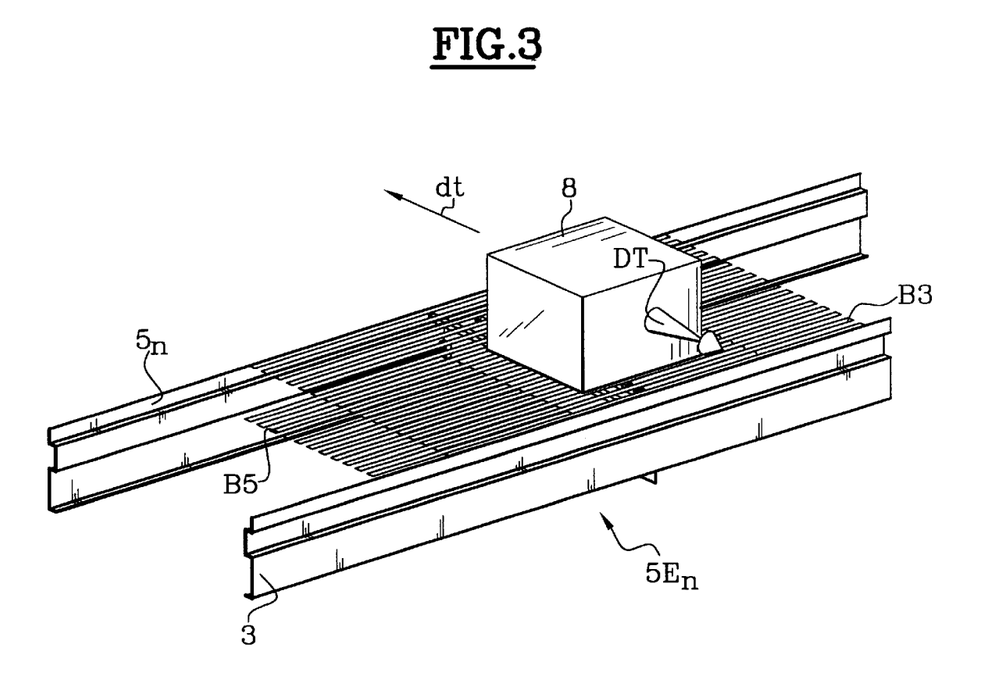
FIG. 3 is a view similar to FIG. 2 showing the transfer of a container by means of the transfer device shown in FIG. 2.

As shown in FIGS. 2 and 3, a conveyor like the conveyor 3 or $5_n$ at a transfer device such as the device $5E_n$ at the entry of the loading position $6_n$ comprises eight narrow endless bands B3, B5 extending parallel to the direction D3, D5 containers are conveyed in. In this embodiment the bands of the backward conveyor and the bands of each loading conveyor can be driven by a single drive system. In a different embodiment, each multiband conveyor comprises 16 narrow bands when the containers are relatively wide.

Figure 4:
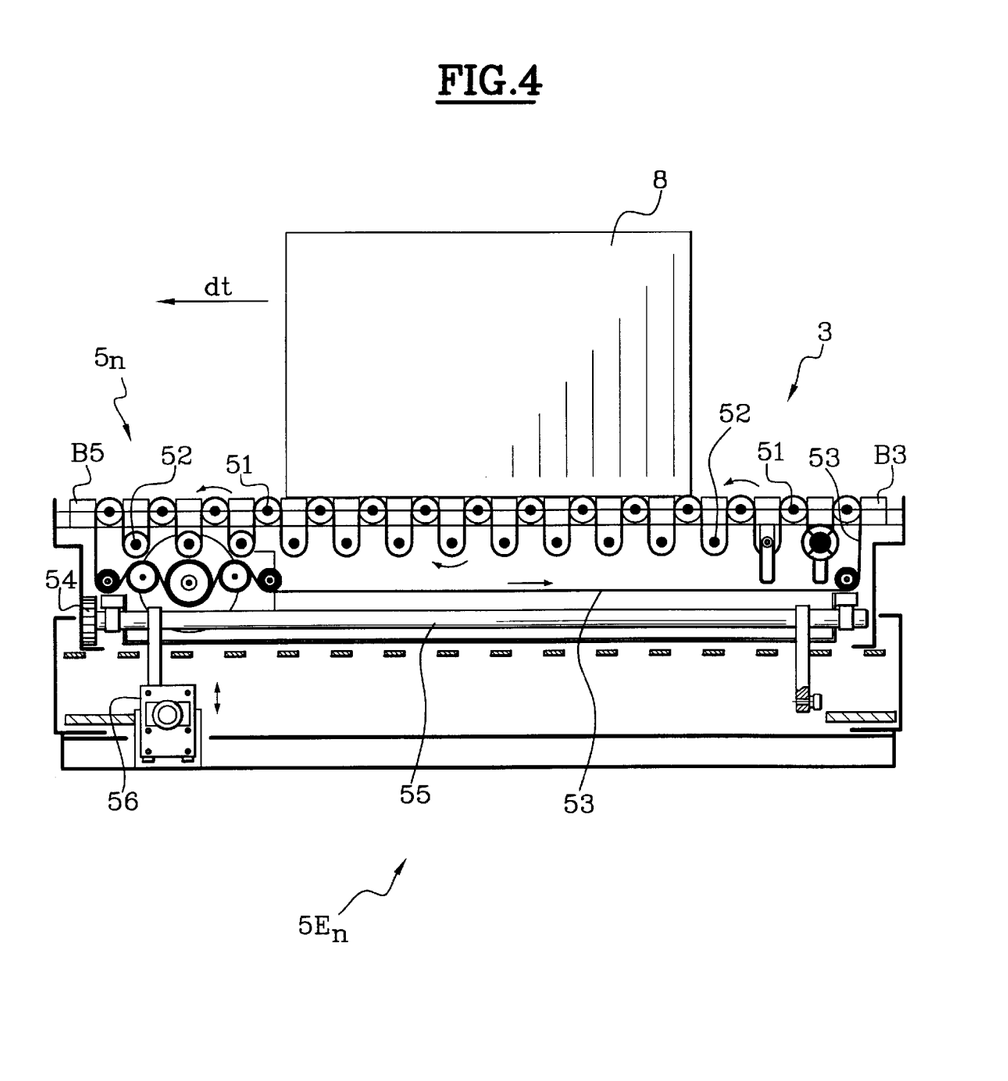
FIG. 4 is a cross-sectional view of the transfer device from FIG. 3.

As shown in FIG. 4 in particular, the bands B3 and B5 of the conveyors 3 and 5 are coplanar in the vicinity of the transfer device $5E_n$. Small rubber transfer rolls 51 are disposed between the bands, and in this example there are (2×8)−1=15 of them, and jockey rollers 52 are disposed under the bands. The rolls have a length substantially equal to the greatest length of the containers 8. An endless drive band 53 winds alternately between the transfer rolls 51 and the jockey rollers 52 and is driven by a drive wheel 54 so that the top periphery of the transfer rolls 51 moves in the required transfer direction dt, from the conveyor 3 to the conveyor $5_n$. The components 51 through 54 with the electric motor associated with the wheel 54 are mounted on a frame 55 of a parallelogram that can be deformed by a ram 56 installed in the frame of the transfer device. The ram 56 is controlled by the control unit UC so as to raise the frame 55 and therefore the transfer rolls 51 from a lowered position in which the rolls 51 are approximately 10 mm below the bands B3 and B5 to a raised position in which the rolls are approximately 10 mm above the bands B3 and B5, then lowering the frame 53 with the rolls 51.

When a container 8 is signalled to the central control unit UC by a container detector cell situated at the entry of the transfer device $5E_n$ and laterally of the backward conveyor 3, the unit UC controls the raising of the frame 55 by the ram 56 as soon as the container 8 is positioned on the bands B3 over the transfer rolls 51. When the rolls 51 go to an intermediate position in which they are flush with the bands B3 and B5, as shown in FIG. 4, the container 8 begins to be transferred perpendicularly to the conveyors 3 and $5_n$, from one to the other in the direction of the arrow dt, by virtue of the rotation of the rolls 51. Then another container detector cell located at the outlet of a transfer device $5E_n$ and laterally of the conveyor $5_n$ signals substantial alignment of the container 8 with the conveyor $5_n$ for the control unit UC to control the ram 56 to lower the frame 55. As the transfer rolls 51 descend from the raised position to the lowered position, in their intermediate position they put the container 8 down on the bands B5 of the conveyor $5_n$ which entrains it into the loading position $6_n$.

To avoid two containers being placed on the transfer device or one container being transferred while another is crossing the transfer device on one of the conveyors, the minimum pitch between two successive containers verified by the container detector cells is determined to avoid accumulation of containers on the conveyors.

Figure 5:
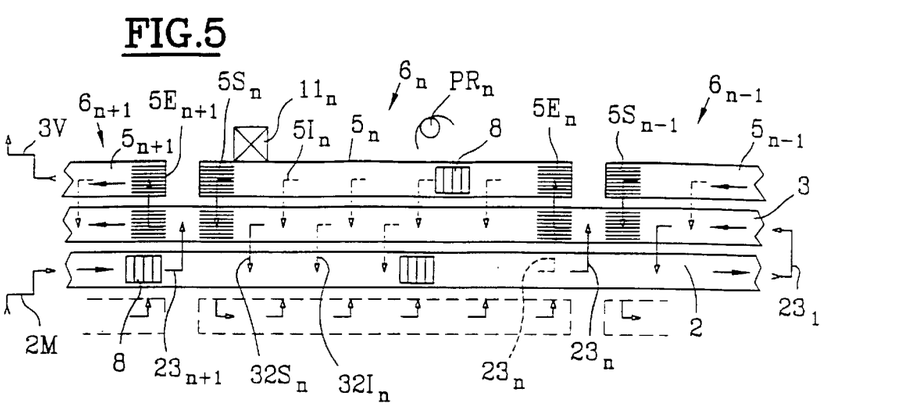
FIG. 5 is a schematic plan view of a loading position in a first embodiment of the invention.

The transfer device described hereinabove is used whenever containers 8 are to be transferred from one conveyor to another conveyor running in the same directions D3 and D5, as in the transfer devices 2M, $5E_n$, $5S_n$ and 3V and the transfer devices $5I_n$ mentioned later (FIG. 5). However, this transfer device is independent of the directions in which the two conveyors run. Accordingly, the transfer device shown in FIGS. 2 through 4 is also used to transfer containers 8 from a first conveyor, such as the forward conveyor 2, to a second conveyor, such as the backward conveyor 3, running in the opposite direction to the first conveyor, and can be the transfer device 23 or any other transfer device $23_n$, $32S_n$, $32I_n$ mentioned below, for transferring containers between the conveyors 2 and 3 (FIG. 5). A transfer of this kind between conveyors running in opposite directions is indicated by three-dimensional arrows F3, DT and F2 in FIGS. 2 and 3.

The loading position $6_n$ is shown in detail in FIG. 5, at the level of the conveyors 2, 3 and $5_n$, in order to avoid over-complicating FIG. 1. In addition to the two transfer devices $5E_n$ and $5S_n$, the position $6_n$ includes in accordance with the invention a transfer device $23_n$ located just upstream of the loading conveyor $5_n$, between the transfer device $5S_{n-1}$ at the outlet of the preceding loading position $6_{n-1}$ and the transfer device $5E_n$ at the entry of the loading conveyor $5_n$. In an alternative embodiment, the transfer device $23_n$ is transversely aligned with the transfer device $5E_n$ situated at the entry of the loading conveyor 5, as shown in dashed outline in FIG. 5. The transfer device $23_n$ transfers containers 8, which can come directly from the entry of the station 1, from the forward conveyor 2 to the backward conveyor 3.

The transfer device $23_n$ reduces the transit time of a container 8 to be loaded in the position $6_n$, or where applicable in one of the positions $6_n$ through $6_N$, by shortening the round trip route of the aforementioned container 8 in the station, between the position $6_n$ and the end transfer device 23. This latter device 23 is denoted $23_1$ in FIG. 5 since it is for the position $6_1$ the equivalent of the device $23_n$ of the position $6_n$.

The transfer device $23_n$ is used to transfer a container 8 to be loaded at the position $6_n$, for example if the position $6_n$ contains few containers awaiting loading on the loading conveyor $5_n$, or if the container 8 must be loaded at one of the subsequent positions $6_{n+1}$ through $6_N$, for example the position $6_{n+2}$ which, after the time to route the container 8 from the transfer device $23_n$ to the transfer device $5E_{n+2}$ at the entry of the position $6_{n+2}$, will then be available for loading the container 8.

In an improved embodiment the loading position $6_n$ includes at least one transfer device $32S_n$ which transfers a container 8 from the backward conveyor 3 to the forward conveyor 2 so as to re-inject a container 8 into the conveyor loop of the station, onto the forward conveyor 2 from the position $6_n$ and onto the backward conveyor 3 to the position $6_n$. The transfer device $32S_n$ is located between the transfer devices $5E_n$ and $5S_n$ at the ends of the loading conveyor $5_n$.

As shown in FIG. 5, the transfer device $32S_n$ is preferably located in the vicinity of the transfer device $5S_n$ at the exit of the loading position $6_n$. For example, a container 8 transferred by the device $32S_n$ is re-injected onto the backward conveyor 3 towards the transfer device $5E_n$ at the entry of the position $6_n$ via the transfer device $23_n$ or any other transfer device $23_{n-1}$ through $23_1$, after a time lapse sufficient for a preceding container to have been loaded in the position $6_n$, and frees a space on the conveyor $5_n$ so that the re-injected container 8 having made at least one round trip between the devices $23_n$ and $32S_n$ can be transferred to the loading conveyor $5_n$.

If the position $6_n$ contains many containers awaiting relatively long loading on the conveyor $5_n$, when a given container 8 arrives in front of the entry transfer device $5E_n$, the given container 8 can, under the control of the control unit UC, follow a longer or shorter loop on the conveyors 3 and 2 thanks to the transfer devices $32S_n$ through $32S_N$ and $23_n$ through $23_1$, and more generally a plurality of loops a priori of different lengths by virtue of the transfer devices $32S_1$ through $32S_N$ and $23_1$ through $23_N$, for as long as the position $6_n$ or the loading positions $6_1$ through $6_N$ in which the given container 8 is to receive objects are saturated.

Re-injecting containers into the loop of the conveyors 2 and 3 via the transfer devices $32S_1$ through $32S_N$ assures that any container that is to receive objects in one of the positions of the station will receive them before leaving that station. Most importantly, however, re-injecting containers facilitates freeing the route for other containers on route to available loading positions, i.e. these other containers are not stopped by stationary containers waiting on the backward conveyor 3 in front of a completely saturated loading conveyor.

For example, 50 containers sent to position $6_n$ are following by n–1 containers respectively sent to positions $6_1$ through $6_{n-1}$ on the forward conveyor 2. Ten containers are first switched to the position $6_n$ via the transfer device $23_n$. The 50–10 containers still on route to position $6_n$ are not halted in a queue in front of the latter on the conveyor 3, and possibly the conveyor 2, but in accordance with the invention take respective and progressively longer loops through the devices $32S_1$ through $32S_N$ and $23_1$ through $23_N$. This maintains a free route for said subsequent n−1 containers so that they have virtually direct access to the positions $6_n$ through $6_{n-1}$ via the transfer devices $23_1$ through $23_{n-1}$, or possibly indirect access via the transfer device $23_1$, without any waiting time on the backward conveyor 3.

Figure 6:
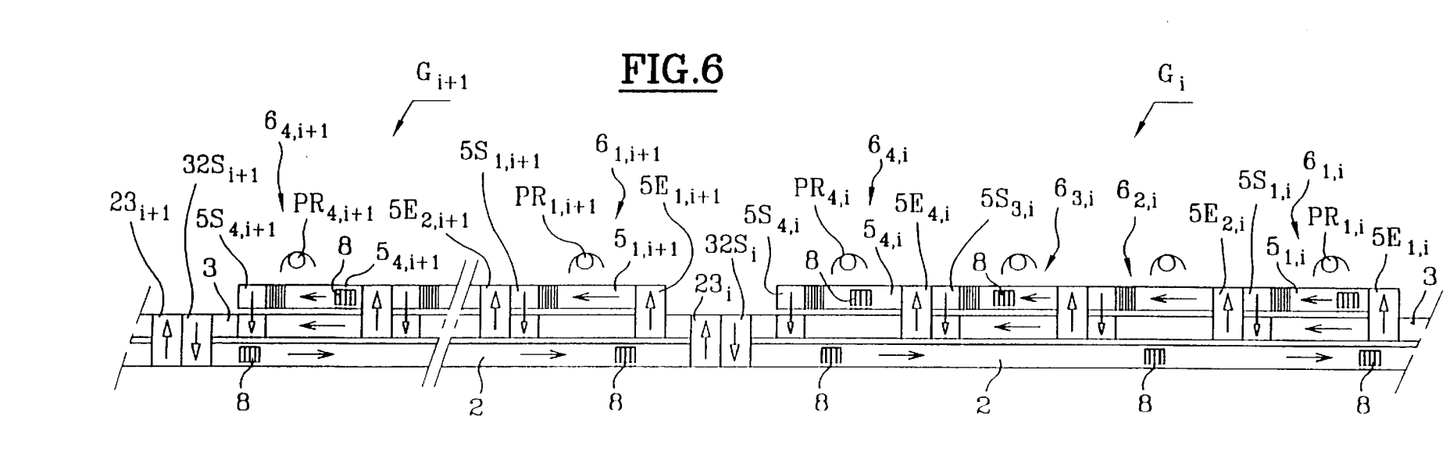
FIG. 6 is a schematic plan view of groups of loading positions in a more economic variant.

In a more economic embodiment the transfer devices such as the devices $23_n$ and $32S_n$ disposed between the conveyors 2 and 3 are periodically interleaved in pairs every M loading positions, the number N of loading positions being generally an integer multiple of M. As shown in FIG. 6, mutually independent transfer devices $32S_i$ and $23S_i$ are provided between two consecutive groups $G_i$ and $G_{i+1}$ each of M=4 loading positions $6_{1,i}$ through $6_{4,i}$, $6_{1,i+1}$ through $6_{4,i+1}$. The transfer device $32S_i$ is downstream of the output transfer device $5S_{4,i}$ of the last loading position $6_{4,i}$ of the group $G_i$, in the transfer direction of the backward conveyor 3, for re-injecting containers 8 from the backward conveyor 3 to the forward conveyor 2. The transfer device $23_i$ is situated between the transfer device $32S_i$ and the entry transfer device $5E_{1,i+1}$ of the first loading position $6_{1,i+1}$ of the next group $G_{i+1}$ to transfer containers 8 from the forward conveyor 2 to the backward conveyor 3.

In FIG. 6, in a group $G_i$, the M=4 loading positions are back-to-back, i.e. the output transfer device $5S_{m,i}$ of the loading position $6_{m,i}$ is disposed in the vicinity of or back-to-back with the entry transfer device $5E_{m+1,i}$ of the following loading position $6_{m+1,i}$ and is independent of the latter, m being an integer between 1 and M−1=3.

Figure 7:
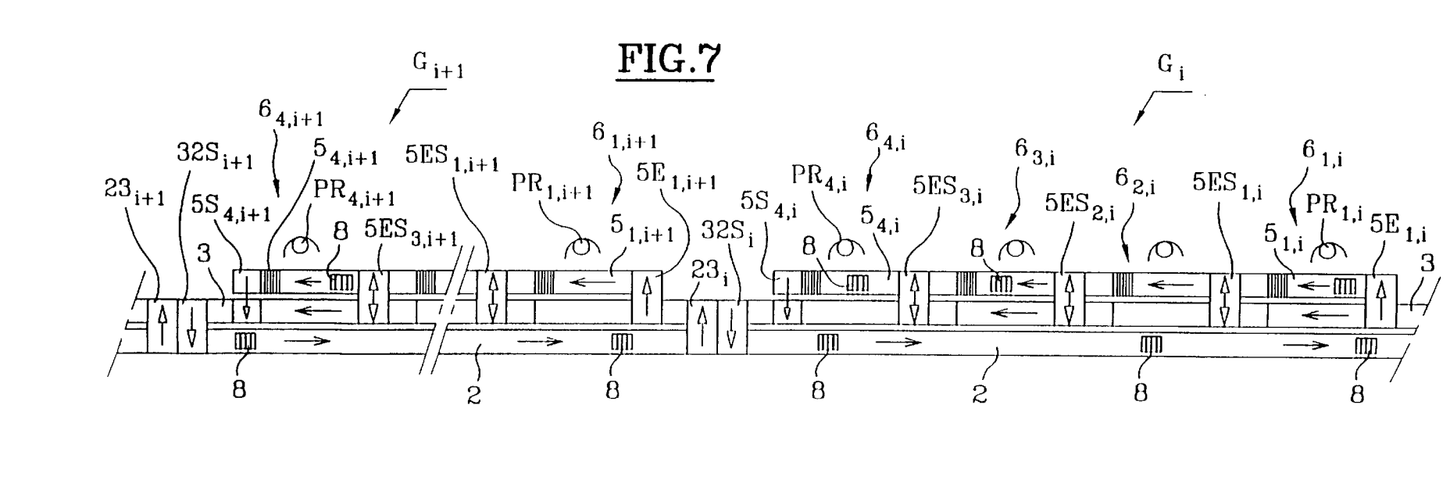
FIG. 7 is a plan view similar to FIG. 6 of an even more economic embodiment.

In an even more economic embodiment shown in FIG. 7 the exit transfer positions $5S_{m,i}$ and the entry transfer positions $5E_{m+1,i}$ respectively disposed in proximity or back-to-back in FIG. 6 are combined in entry/exit transfer positions $5ES_{m,i}$. The transfer device $5ES_{m,i}$ operates part-time to transfer loaded containers 8 from the downstream end of the loading conveyor $5_{m,i}$ to the backward conveyor 3 and part-time to transfer containers 8 to be loaded from the backward conveyor 3 to the upstream end of the loading conveyor $5_{m+1,i}$. The first aforementioned transfer takes priority over the second aforementioned transfer, or vice versa.

Referring again to FIG. 5, in other embodiments other independent transfer devices are provided. For example, intermediate transfer devices $32I_n$ for transferring containers from the backward conveyor 3 to the forward conveyor 2 are disposed between the transfer devices $5E_n$ and $5S_n$ in the loading position $6_n$. These intermediate transfer devices $32I_n$ assure optimal routing of any container that has to be re-injected onto the forward conveyor 2 in order for the container to enter a previously unavailable loading position, as soon as this loading position becomes available to accept it.

With a similar aim, in a different embodiment, the loading position $6_n$ contains one or more intermediate transfer devices $5I_n$ located between the transfer devices $5E_n$ and $5S_n$ to transfer containers from the loading conveyor $5_n$ to the backward conveyor 3. The intermediate transfer devices $5I_n$ are used, for example, if a given container has been filled quickly with one or two objects before the following loaded containers on the loading conveyor $5_n$ have had time to be transferred by the transfer device $5S_n$ at the exit of the position $6_n$ or if a container takes priority over at least one given container on the conveyor $5_n$ and must be loaded quickly in the position $6_n$, the given container being subsequently re-injected onto the forward conveyor 2.

Each intermediate transfer device $5I_n$ can be controlled either automatically by the central control unit UC or manually by pushbutton via the picker $PR_n$ in the loading position $6_n$.

The invention is not limited to the embodiments shown in FIGS. 1 and 5 through 7 in which loading conveyors are disposed along the backward conveyor 3.

In a different embodiment, loading conveyors are disposed only along the forward conveyor 2, as shown in dashed outline in FIG. 5.

In a further embodiment, loading conveyors are disposed along the forward conveyor 2 and along the backward conveyor 3.

As already stated, the batch of objects to be loaded into a container at a position can be monitored by weighing. For example, a monitoring table $11_n$ assists the picker $PR_n$ to monitor the objects picked from the rack $10_n$ to be placed in the containers waiting on the conveyor $5_n$. The monitoring table $11_n$ is fixed laterally to the loading conveyor $5_n$ just ahead of the transfer device $5S_n$ so that the picker $PR_n$ can remove the first container from the queue on the conveyor $5_n$ to place it on a weighing platform of a weighing device included in the table. After loading and weighing, the loaded container is placed on a re-injection area which can be coincident with the part of the exit transfer device $5S_n$ common to the latter and to the loading conveyor $5_n$. In another embodiment the table $11_n$ is mobile, either manually or by a motor drive, along the loading conveyor $5_n$, in order to be able to take up a container anywhere along the conveyor $5_n$.

The monitoring table $5_n$ is that described in European patent No. 494,014, for example. It includes a microprocessor-based logic unit connected to

- a screen for displaying a list of the objects to be picked in the compartment $10_n$ for a container and their location,
- a keypad for entering problems or missing objects and possibly for signalling the end of loading and weighing of a container,
- a transmitter-receiver connected to the control unit UC by a link LT,
- a weighing device for weighing objects loaded into a container one by one or in batches so as to prevent any error in selecting objects from the rack,
- a first reader for reading a container code cC and a object list code CL on a container placed on the weighing device, and
- a second reader for reading the codes on each object to be picked in the rack $10_n$.

Figure 8:
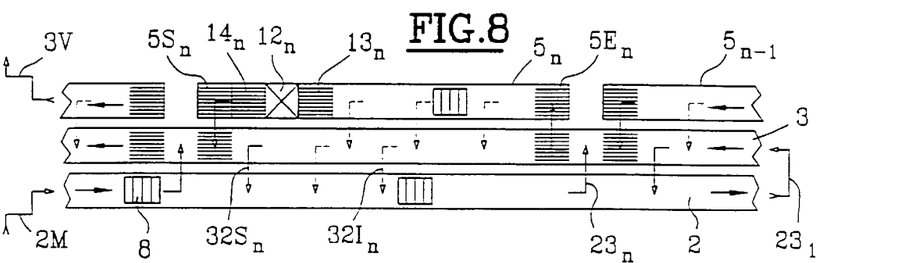
FIG. 8 is a schematic plan view of a loading position according to a variant of the invention.
Figure 9:
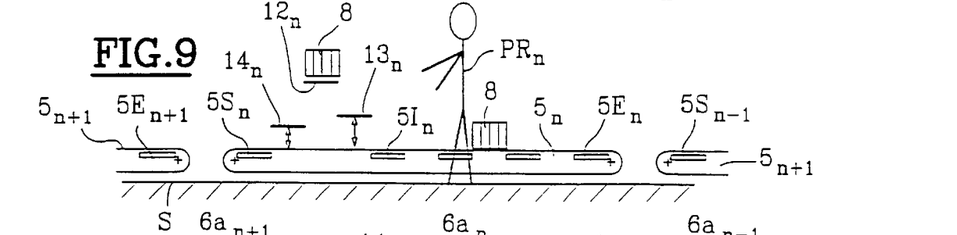
FIG. 9 is a longitudinal side view of the loading position shown in FIG. 8.

In an embodiment shown in FIGS. 8 and 9 the monitoring table $12_n$ is integrated into the path of the conveyors 8 on the loading conveyor $5_n$. The pickers therefore do not manipulate the containers. The table $12_n$ is immobile in a plane which is raised by 20 cm to 30 cm, for example, above the plane in which containers are conveyed on the loading conveyor $5_n$. In practice, all the conveyors 2, 3 and $5_1$ through $5_n$ in the station 1 are disposed one alongside the other on the floor, and the table $12_n$ is 50 cm to 80 cm above the floor so that it is readily accessible to the hands of the picker $PR_n$. In this embodiment, the part of the rack $10_n$ which is above the conveyors 2, 3 and $5_n$ has a much larger volume for storing objects.

A reciprocating lift/lower device $13_n$ is provided upstream of the monitoring table $12_n$ for lifting each container 8 waiting on the loading conveyor $5_n$ on to the table $12_n$. Another reciprocating lift/lower device $14_n$ is provided downstream of the monitoring table $12_n$ for lowering each container 8 whose load has been verified on the monitoring table $12_n$ onto the downstream end $5S_n$ of the loading conveyor $5_n$.

In an alternative embodiment, monitoring the loading of the conveyor by weighing the container for each object or batch of objects placed in the latter is dispensed with.

Figure 10:
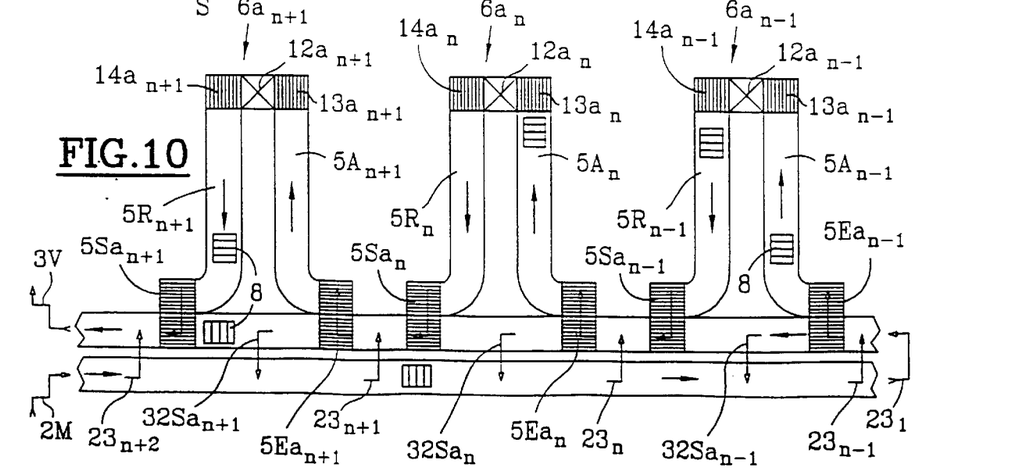
FIG. 10 is a plan view of loading positions extending substantially perpendicular to forward and backward conveyors in a station according to a second embodiment of the invention.

In a second embodiment of the invention, each loading conveyor $5_n$ is replaced by a forward loading conveyor $5A_n$ and a backward loading conveyor $5R_n$ disposed substantially perpendicularly to the backward conveyor 3. At the upstream end of the forward loading conveyor $5A_n$ is a transfer device $5Ea_n$ for transferring containers 8 from the backward conveyor 3 to the forward loading conveyor $5A_n$. The containers 8 entering the position $6a_n$ on the forward loading conveyor $5A_n$ are transferred from the downstream end of the forward loading conveyor $5A_n$ to the upstream end of the backward loading conveyor $5R_n$ by a transfer device $13a_n$–$14a_n$ similar to the transfer device $23_1$ at the ends of the conveyors 2 and 3.

A container 8 is preferably loaded in the position $6a_n$ between the downstream end of the forward loading conveyor $5A_n$ and the upstream end of the backward loading conveyor $5R_n$. As shown in FIG. 10, a table $12a_n$ similar to the table $12_n$ is disposed between a reciprocating lift/lower device $13a_n$ located at the upstream end of the forward loading conveyor $5A_n$ and a reciprocating lift/lower device $14a_n$ located at the downstream end of the backward loading conveyor $5R_n$. The lift/lower devices $13a_n$ and $14a_n$, which respectively lift a container from the forward loading conveyor $5A_n$ to the table $12a_n$ and lower the container from the table $12a_n$ to the backward loading conveyor $5R_n$, also transfer a container from the forward loading conveyor to the backward loading conveyor.

After a container is lowered by the lift/lower device $14a_n$, the container transported on the backward loading conveyor $5R_n$ is transferred onto the backward conveyor 2 by a transfer device $5Sa_n$ located at the downstream end of the backward loading conveyor.

In the embodiment shown in FIG. 10 transfer devices $23_n$ are also provided to shorten the path of containers from the forward conveyor 2 and transfer devices $32Sa_n$ are provided for re-injecting containers onto the forward conveyor 2, these transfer devices being located like those of the embodiment shown in FIG. 5.

What I claim is:

1. An arrangement for conveying containers, comprising:
   (a) a forward conveyor and a backward conveyor for conveying containers in opposite conveying directions,
   (b) a plurality of loading conveyors arranged along one of said forward and backward conveyors,
   (c) a plurality of first means for transferring containers from said one of said forward and backward conveyors to upstream ends of respective loading conveyors, and
   (d) a plurality of second means for transferring containers from said forward conveyor to said backward conveyor;
   (e) at least one of said second transferring means being located between a downstream end of one of two consecutive loading conveyors along said one of said forward and backward conveyors and an upstream end of the other of said two consecutive loading conveyors.

2. The arrangement claimed in claim 1, wherein at least one of said second transferring means is aligned with one of said first transferring means.

3. An arrangement as claimed in claim 1, and further comprising:
   (e) third means located between the ends of each loading conveyor, respectively, for transferring containers from said backward conveyor to said forward conveyor.

4. The arrangement claimed in claim 3, wherein each of said third transferring means is arranged adjacent the downstream end of the associated loading conveyor, respectively.

5. An arrangement as claimed in claim 3, wherein a plurality of said third transferring means are located between the ends of the associated loading conveyor, respectively.

6. The arrangement claimed in claim 1, wherein said second transferring means are respectively located periodically between groups of consecutive loading conveyors, and further comprising third means respectively located near said second transferring means for transferring containers from said backward conveyor to said forward conveyor.

7. The arrangement claimed in claim 6, wherein each second transferring means is located upstream of the respective third transferring means located near it, in the conveying direction of said forward conveyor.

8. An arrangement as claimed in claim 1, and further comprising additional means for transferring containers from said loading conveyors to said one of said forward and backward conveyors, respectively.

9. The arrangement claimed in claim 8, wherein said additional transferring means are located at the downstream ends of the respective loading conveyors.

10. An arrangement as claimed in claim 8, and further comprising at least one fourth transferring means located between ends of one of said loading conveyors for transferring containers from said one loading conveyor to said one of said forward and backward conveyors.

11. An arrangement as claimed in claim 1, and further comprising means located at a downstream end of one of two consecutive loading conveyors and an upstream end of the other of the two consecutive loading conveyors partly for transferring containers from said one of said forward and backward conveyors to said upstream end of said other of the two consecutive loading conveyors and partly for transferring containers from said downstream end of said one of the two consecutive loading conveyors to said one of said forward and backward conveyors.

12. An arrangement as claimed in claim 8, and further comprising a plurality of second loading conveyors extending along said other of said forward and backward conveyors and associated with a plurality of means for transferring containers from the other of said forward and backward conveyors to upstream ends of said second loading conveyors respectively, and associated with a plurality of means for transferring containers from downstream ends of said second loading conveyors to said other of said forward and backward conveyors, respectively.

13. The arrangement claimed in claim 1, wherein each loading conveyor is associated with a table raised relative to said each loading conveyor, means arranged upstream of said table for lifting a container from said each loading conveyor onto said table and means arranged downstream of said table for lowering a container from said table onto said each loading conveyor.

14. The arrangement as claimed in claim 13, wherein said lifting means, said table and said lowering means are located in the vicinity of a downstream end of said each loading conveyor.

15. The arrangement claimed in claim 1, wherein at least one loading conveyor includes a forward loading conveyor and a backward loading conveyor arranged substantially perpendicular to said one of said forward and backward conveyors, and means for transferring containers from a downstream end of said forward loading conveyor to an upstream end of said backward loading conveyor.

16. The arrangement claimed in claim 15, wherein said forward loading conveyor and said backward loading conveyor are associated with a table raised relative to said forward loading conveyor and backward loading conveyor, means arranged upstream of said table for lifting a container from the downstream end of said forward loading conveyor onto said table and means arranged downstream of said table for lowering a container from said table onto the upstream end of said backward loading conveyor.

17. The arrangement as claimed in claim 1, where in each conveyor includes a plurality of narrow parallel bands, and each of said first and second transferring means between two respective conveyors comprises respective rolls extending between said bands of said two respective conveyors, means for rotating said rolls in the direction to transfer a container from one of said two respective conveyors towards the other, means for raising said rolls above said bands of said two respective conveyors, and means for lowering said rolls below said bands of said two respective conveyors.

* * * * *